Patented May 19, 1953

2,639,272

UNITED STATES PATENT OFFICE 2,639,272

STYRENE, ALPHA METHYL STYRENE, DRYING OIL FATTY ACID INTERPOLYMERS

Gerald A. Griess and Arthur S. Teot, Midland, Mich., assignors to The Dow Chemical Company, Midland, Mich., a corporation of Delaware No Drawing. Application April 28, 1949, Serial No. 90,265

8 Claims. (Cl. 260—23)

This invention concerns certain new interpolymers of one or more monovinyl aromatic compounds having the general formula:

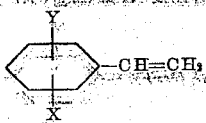

wherein X and Y represent the same, or different members of a group consisting of hydrogen and lower alkyl radicals containing not more than three carbon atoms, an alpha-methylene alkyl aromatic compound having the general formula:

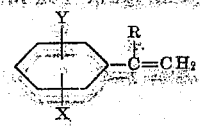

wherein X and Y have the meaning just given and R is a lower alkyl radical containing not more than two carbon atoms, and a drying oil fatty acid, or a mixture of drying oil fatty acids. The invention also pertains to a method of making the interpolymers.

It is known that varnish resins may be prepared by interpolymerization of drying oils with styrene. However, when attempt is made to carry out the interpolymerization in bulk, i. e. in the absence of solvents, or other media, at elevated temperatures in order to reduce the reaction time to a commercially acceptable period, an extremely vigorous exothermic, or "runaway" reaction often occurs. The temperature may rise quickly to the boiling point of the mixture and a considerable part of the styrene monomer be lost. Not only is careful control of the process impossible, but the resulting interpolymer is not as soluble in aliphatic solvents as is desired for general use in paints and varnishes.

In our copending application Serial No. 776,400, filed September 26, 1947, now United States Patent No. 2,468,748, a number of toluene-soluble interpolymers, prepared from a mixture consisting of a monovinyl aromatic compound, e. g. styrene, an alpha-methylene alkyl aromatic compound such as alpha-methyl styrene, and a drying oil, or a mixture of drying oils, and a method of making the same are described. However, in preparing such interpolymers it is important that the drying oil employed as starting material have an average of not more than 35 per cent of its olefinic linkages conjugated with respect to one another, in order to avoid the formation of highly cross-linked interpolymers which are insoluble in toluene and are therefore unsuitable for use as varnish resins.

It has now been found that a mixture consisting of a monovinyl aromatic compound and an alpha-methylene alkyl aromatic compound having the aforementioned formulas, can be interpolymerized in all proportions with a drying oil fatty acid containing conjugated or non-conjugated olefinic linkages, or a mixture of such drying oil fatty acids, to form polymeric products which are soluble in toluene and other usual varnish solvents. The interpolymerization reaction proceeds smoothly and can readily be controlled, even when polymerizing large quantities of the materials in bulk.

We have further found that a mixture consisting of such polymerizable aromatic compounds and a highly conjugated drying oil fatty acid, e. g. tung oil fatty acids, can readily be interpolymerized in bulk without the formation of highly cross-linked toluene-insoluble polymeric products, and without the occurrence of an exothermic "runaway" polymerization reaction.

The invention permits the production of clear interpolymers from a mixture consisting of a monovinyl aromatic compound, e. g. styrene, an alpha-methylene alkyl aromatic compound and a drying oil fatty acid, employing a drying oil fatty acid, or a mixture of drying oil fatty acids, having a wider range as regards degree of unsaturation, than can be used with styrene alone. It also permits the production of clear toluene-soluble interpolymers from a mixture consisting of a monovinyl aromatic compound, e. g. styrene, and an alpha-methylene alkyl aromatic compound such as alpha-methyl styrene, and a highly conjugated drying oil fatty acid, employing the latter substance in greater proportions than can be used with the corresponding drying oil alone.

The new interpolymers are liquid to hard brittle solids, depending in part upon the relative proportion of the drying oil fatty acid, or the mixture of drying oil fatty acids, used and the relative proportions of the monovinyl aromatic compound and the alpha-methylene alkyl aromatic compound interpolymerized therewith. The polymeric products are all soluble in toluene and range from clear toluene-soluble products through cloudy, to opaque interpolymers, depending in part upon the degree of unsaturation, i. e. the number of olefinic linkages in the drying oil fatty acid starting materials.

The fact that the interpolymer is cloudy, or opaque, not only indicates that the relative proportions of the drying oil fatty acid and the mixture consisting of a monovinyl aromatic compound and the alpha-methylene alkyl aromatic compound, is approximately the critical proportions for the preparation of clear polymeric products in accordance with a preferred practice of the invention, but also indicates that the number of olefinic linkages, i. e. the degree of unsaturation, of the drying oil fatty acid is approximately the minimum value required for the preparation of clear interpolymers from the mixture of polymerizable components in those relative proportions. In some instances, therefore, the polymeric products may be cloudy to opaque, throughout a part, or parts, of the complete range of proportions, particularly when an oil fatty acid, e. g. soybean oil fatty acids, which contains an average number of olefinic linkages corresponding to an iodine number of about 130, or less, is employed as the polymerizable oil fatty acid component of the mixture of polymerizable starting materials. However, the opaque compositions are useful in the preparation of enamels, i. e. varnishes to which pigments are added, and in the manufacture of floor covering, e. g. linoleum. The clear interpolymers are useful in the preparation of varnishes, e. g. by cooking the same with drying oils, or by esterification of the carboxylic acid groups with mono- and polyhydric alcohols such as butanol, glycerine, or pentaerythritol, etc. Certain of the clear interpolymers are also useful in the preparation of modified alkyd resins, particularly those containing about 70 per cent by weight or less of the mixture consisting of a monovinyl aromatic compound, e. g. styrene, and an alpha-methylene alkyl aromatic compound, preferably alpha-methyl styrene, chemically combined, i. e. interpolymerized, with the drying oil fatty acid. The modified alkyd resins may be prepared by esterifying the carboxylic acid groups in the interpolymer with a polyhydric alcohol such as glycerine or pentaerythritol so as to form a product containing free hydroxyl groups and thereafter reacting the product with phthalic acid or phthalic anhydride.

Any drying oil fatty acid, or mixture of drying oil fatty acids containing conjugated or non-conjugated olefinic linkages, which drying oil fatty acid is free of functional groups other than the carboxylic acid group, may be employed in preparing the new interpolymers. Examples of suitable drying oil fatty acids are linseed oil fatty acids, soybean oil fatty acids, hempseed oil fatty acids, dehydrated castor oil fatty acids, tung oil fatty acids, perilla oil fatty acids, or fish oil fatty acids such as sardine oil fatty acids or menhaden oil fatty acids, etc. Mixtures of any two or more of such drying oil fatty acids may also be used. The drying oil fatty acids are prepared by saponification of the corresponding drying oils and may be purchased in commercial quantities.

As the monovinyl aromatic compound starting material, styrene is preferred but other polymerizable nuclear substituted alkyl styrenes such as ortho-methyl styrene, para-methyl styrene, ortho-ethyl styrene, para-ethyl styrene, ortho,-para-dimethyl styrene, ortho,para-diethyl styrene, ortho-methyl-para-isopropyl styrene, or ortho-methyl-para-ethyl styrene, etc., may be employed.

Alpha-methyl styrene is preferably used as the alpha-methylene alkyl aromatic component of the compositions. However, other alpha-methylene alkyl aromatic compounds such as alpha-ethyl styrene, para-methyl-alpha-methyl styrene, ortho,para-dimethyl-alpha-methyl styrene, ortho,para-diethyl-alpha-methyl styrene, para-ethyl-alpha-methyl styrene, para-isopropyl-alpha-methyl styrene, or ortho,para-diisopropyl-alpha-methyl styrene, etc., may be employed. Mixtures of any of these compounds with one another, or with alpha-methyl styrene may also be used.

In preparing interpolymers of the drying oil fatty acid, or a mixture of the drying oil fatty acids, and a mixture consisting of a monovinyl aromatic compound and an alpha-methylene alkyl aromatic compound, the alpha-methylene alkyl aromatic compound, e. g. alpha-methyl styrene, may be used in amount corresponding to from 15 to 50, preferably from 20 to 40, per cent by weight of the combined weight of the alpha-methylene alkyl aromatic compound and the monovinyl aromatic compound, preferably styrene. The drying oil fatty acid, or mixture of drying oil fatty acids, may be used in amount corresponding to from 10 to 90 per cent by weight of the combined weight of the polymerizable materials, the mixture consisting of a monovinyl aromatic compound and the alpha-methylene alkyl aromatic compound making up the remaining 90 to 10 per cent by weight of said polymerizable materials to a total of 100 per cent.

The polymerizable starting materials are preferably polymerized in a closed container, or in contact with an inert atmosphere, e. g. nitrogen, helium, or methane, etc., in the absence of an inert liquid media such as benzene, toluene, or xylene, etc. However, the polymerization may be carried out with limited access of air, e. g. by way of a reflux condenser, to the materials. In practice, the drying oil fatty acid, the monovinyl aromatic compound, and the alpha-methylene alkyl aromatic compound, are mixed together in the desired proportions and the mixture is heated at a temperature below its atmospheric boiling point until polymerization is substantially complete. The polymerization may be carried out at temperatures of from 120° to 300° C., but temperatures of from 150° to 200° C. are preferred. The mixture should not be heated to a temperature sufficient to cause decomposition of the product. Polymerization is usually complete after 10 to 50 hours of heating at the preferred temperatures.

The rate of polymerization may be increased by adding to the starting mixture a small amount, e. g. from 0.5 to 3 per cent by weight, of a polymerization catalyst such as benzoyl peroxide, acetyl benzoyl peroxide, tertiary-butyl perbenzoate, or tertiary-butyl hydroperoxide, etc. The addition of a polymerization catalyst is advantageous in that it permits the production of clear interpolymers employing the drying oil fatty acid and the mixture consisting of a monovinyl aromatic compound, e. g. styrene, and the alpha-methylene alkyl aromatic compound, preferably alpha-methyl styrene, in a somewhat wider range of proportions than can be used in the absence of a catalyst.

In preparing certain of the interpolymers, particularly those in which a drying oil fatty acid having a low degree of unsaturation, e. g. soybean oil fatty acids, or hempseed oil fatty acids, is employed, the clarity, i. e. the tendency of the polymeric product to be opaque, is materially affected by the manner in which the ingredients are mixed together. Best results are frequently obtained when the drying oil fatty acid, or the mixture of drying oil fatty acids, is first heated to a polymerization temperature and a mixture of the monovinyl aromatic compound, e. g. styrene, the alpha-methylene alkyl aromatic compound, e. g. alpha-methyl styrene, and a polymerization catalyst is added over a period of several hours.

Upon completion of the polymerization reaction, volatile ingredients, e. g. unreacted styrene or alpha-methyl styrene, may be separated from the polymeric product by heating the mixture in vacuum to a temperature of about 200° C., or by other usual manner, e. g., by distillation of the volatile ingredients at atmospheric pressure, or by passing steam through the heated reaction mixture. The mixture should not be heated to a temperature sufficient to cause decomposition of the product.

The following examples illustrate practice of the invention, but are not to be construed as limiting the scope thereof.

EXAMPLE 1

A refined linseed oil fatty acid having the following constants as determined by conventional tests: iodine number, 174.2; acid number 197, saponification number 9 and unsaponifiable 0.77 was interpolymerized in admixture with styrene and alpha-methyl styrene. In each of a series of experiments a mixture consisting of the linseed oil fatty acid, the styrene, and the alpha-methyl styrene, in various relative proportions, together with one per cent by weight of benzoyl peroxide as polymerization catalyst was sealed in separate glass bottles. The bottles were placed in an oven and heated to a temperature of 150° C. for a period of 48 hours to polymerize the mixtures. Thereafter, the bottles were removed from the oven, cooled to room temperature and the appearance of the polymeric products noted. In the following Table I the relative proportions of the starting materials in the polymerizable mixtures is stated in per cent by weight of each component, based on the combined weight of the polymerizable starting materials and the appearance of the polymeric product is noted.

*Table I*

| Run No. | Linseed Oil Fatty Acids, Percent | Styrene, Percent | Alpha-Methyl Styrene, Percent | Polymeric Product |
|---|---|---|---|---|
| 1 | 10 | 63 | 27 | Clear. |
| 2 | 20 | 56 | 24 | Do. |
| 3 | 30 | 49 | 21 | Do. |
| 4 | 40 | 42 | 18 | Do. |
| 5 | 50 | 35 | 15 | Do. |
| 6 | 60 | 28 | 12 | Do. |
| 7 | 70 | 21 | 9 | Do. |
| 8 | 80 | 14 | 6 | Do. |

EXAMPLE 2

Dehydrated castor oil fatty acid having an iodine number of about 159 and an acid number of 197, was interpolymerized with styrene and alpha-methyl styrene by procedure described in Example 1. In Table II the relative proportions of the starting materials in the polymerizable mixtures is stated in per cent by weight of each component and the appearance of the polymeric product is noted.

*Table II*

| Run No. | Dehydrated Castor Oil Fatty Acid, Percent | Styrene, Percent | Alpha-Methyl Styrene, Percent | Polymeric Product |
|---|---|---|---|---|
| 1 | 10 | 63 | 27 | Clear. |
| 2 | 20 | 56 | 24 | Do. |
| 3 | 30 | 49 | 21 | Do. |
| 4 | 40 | 42 | 18 | Do. |
| 5 | 50 | 35 | 15 | Cloudy. |
| 6 | 60 | 28 | 12 | Clear. |
| 7 | 70 | 21 | 9 | Do. |
| 8 | 80 | 14 | 6 | Do. |

EXAMPLE 3

By procedure similar to that described in Example 1, a soybean oil fatty acid having an iodine number of about 132 and an acid number of 200 was interpolymerized with a mixture of styrene and alpha-methyl styrene. In Table III the relative proportions of the starting materials is stated in per cent by weight and the appearance of the polymeric product is noted.

*Table III*

| Run No. | Soybean Oil Fatty Acid, Percent | Styrene, Percent | Alpha-Methyl Styrene, Percent | Polymeric Product |
|---|---|---|---|---|
| 1 | 10 | 63 | 27 | Clear. |
| 2 | 20 | 56 | 24 | Do. |
| 3 | 30 | 49 | 21 | Cloudy. |
| 4 | 40 | 42 | 18 | Opaque. |
| 5 | 50 | 35 | 15 | Do. |
| 6 | 60 | 28 | 12 | Do. |
| 7 | 70 | 21 | 9 | Cloudy. |
| 8 | 80 | 14 | 6 | Clear. |

EXAMPLE 4

A mixture consisting of 3 parts by weight of soybean oil fatty acids and 1 part by weight of tung oil fatty acids, which mixture of oil fatty acids had an iodine number of approximately 140, was used to prepare a series of interpolymers with a mixture consisting of styrene and alpha-methyl styrene. Separate mixtures consisting of various amounts of styrene, alpha-methyl styrene and the mixture of oil fatty acids together with 2 per cent by weight of benzoyl peroxide as polymerization catalyst were sealed in glass bottles. The bottles were placed in an oven and the mixtures polymerized by heating the same to a temperature of 150° C. for 24 hours, then raising the temperature to 200° C. and heating for 24 hours longer. Thereafter, the bottles were removed from the oven, cooled to room temperature and the appearance of the polymeric product noted. In Table IV the relative proportions of the starting materials in the polymerizable mixtures is stated in percent by weight and the appearance of the polymeric product is noted. In the table, the letters TOFA and SOFA are used to represent tung oil fatty acid and soybean oil fatty acid, respectively.

*Table IV*

| Run No. | Mixture of TOFA and SOFA, Percent | Styrene, Percent | Alpha-methyl Styrene, Percent | Polymeric Product |
|---|---|---|---|---|
| 1 | 10 | 72 | 18 | Cloudy. |
| 2 | 20 | 64 | 16 | Do. |
| 3 | 30 | 56 | 14 | Clear. |
| 4 | 40 | 48 | 12 | Do. |
| 5 | 50 | 40 | 10 | Do. |
| 6 | 60 | 32 | 8 | Do. |
| 7 | 70 | 24 | 6 | Do. |
| 8 | 80 | 16 | 4 | Do. |
| 9 | 90 | 8 | 2 | Do. |

EXAMPLE 5

A tung oil fatty acid having the constants, iodine number about 192 and acid number 193, was interpolymerized in admixture with styrene and alpha-methyl styrene to make a resin. A mixture consisting of 40 pounds of the tung oil fatty acid, 102 pounds of styrene and 18 pounds of alpha-methyl styrene was placed in a reaction vessel and 1.6 pounds of benzoyl peroxide added thereto as polymerization catalyst. The mixture was stirred and heated to a temperature sufficient to cause gentle refluxing. Thereafter, the temperature of the mixture was gradually raised to 200° C., over a period of 14 hours, as refluxing permitted, and was heated at a temperature of 200° C. for 5 hours longer. Superheated steam at a tempearture of about 200° C. was then passed through the reaction mixture for a period of three hours to distill volatile ingredients. The mixture was thereafter heated at temperatures between 170° and 200° C., under an absolute pressure of about 380 mm. of Hg for a period of 0.6 hour, then cooled to room temperature. A total of 6.75 pounds of oil was separated from the reaction mixture. The product consisted of 131 pounds of a clear solid resin having a melting point of 118° F., an acid number of 52.2 and contained 0.64 per cent by weight of volatile material. A solution consisting of 60 per cent by weight of the resin in toluene had a viscosity of R–S (Gardner-Holdt scale).

EXAMPLE 6

By procedure similar to that described in Example 5, a resin was prepared from a mixture consisting of 24 pounds of tung oil fatty acid, 27.2 pounds of alpha-methyl styrene, 108.8 pounds of styrene and 1.6 pounds of benzoyl peroxide as polymerization catalyst. The product was a clear amber resin having a melting point of 150° F. A solution consisting of 60 per cent by weight of the resin in toluene had a viscosity of W–X (Gardner Holdt).

EXAMPLE 7

A charge consisting of 28.2 pounds of dehydrated castor oil fatty acids was placed in a reaction vessel. The mixture was stirred and heated to a temperature of 140° C. Thereafter, a mixture consisting of 103.5 pounds of styrene, 25.1 pounds of alpha-methyl styrene and 1.6 pounds of benzoyl peroxide as polymerization catalyst was added to the dehydrated castor oil fatty acid over a period of 4 hours. The temperature of the mixture was then gradually raised to 200° C. over a period of 4 hours, and was maintained at a temperature of 200° C. for 12 hours longer. Volatile ingredients were then separated from the reaction mixture by procedure similar to that described in Example 5. A total of 4.5 pounds of oil was separated from the reaction mixture. The product consisted of 138 pounds of a clear resin having a melting point of 130° F., an acid number of 38.1, and contained 1.01 per cent volatile matter. A solution consisting of 60 per cent by weight of the resin in toluene had a viscosity of T (Gardner-Holdt).

EXAMPLE 8

A mixture consisting of 5 parts by weight of tung oil fatty acid, 5 parts of linseed oil fatty acid, 63 parts of styrene, 27 parts of alpha-methyl styrene and 1 part of benzoyl peroxide as polymerization catalyst, was sealed in a glass bottle and heated to a temperature of 200° C. over a period of 16 hours, then cooled to room temperature. The product was a clear hard substantially colorless resin. It was soluble in toluene.

EXAMPLE 9

A charge consisting of 60 grams of linseed oil fatty acid was placed in a reaction flask equipped with a reflux condenser and stirrer. The mixture was stirred and heated to a temperature of 140° C. Thereafter, a mixture consisting of 192 grams of styrene, 48 grams of alpha-methyl styrene and 3 grams of benzoyl peroxide as polymerization catalyst, was added to the heated linseed oil fatty acid over a period of 4 hours. The temperature of the mixture was then gradually raised to 200° C. over a period of 5 hours as refluxing permitted and was maintained at a temperature of 200° C., for 13 hours longer. Steam was then passed through the reaction mixture at a temperature of 200° C. for a time of 30 minutes to distill volatile ingredients. Thereafter, the mixture was heated at temperatures between 160° and 200° C. under an absolute pressure of about 6 mm. of Hg for a time of 3 hours, then cooled to room temperature. The product was a clear resin having a melting point of 125° F., and contained 0.31 per cent by weight of volatile material. A solution consisting of 60 per cent by weight of the resin in toluene had a viscosity of M–N (Gardner-Holdt).

EXAMPLE 10

By procedure similar to that described in Example 9, a resin was prepared by interpolymerizing a mixture consisting of 42.75 grams of tung oil fatty acid and 14.25 grams of linseed oil fatty acid, with a mixture consisting of 192 grams of styrene and 48 grams of alpha-methyl styrene, which latter mixture contained 3 grams of benzoyl peroxide as polymerization catalyst. The product was a clear amber resin having a melting point of 120° F. A solution consisting of 60 per cent by weight of the resin in toluene had a viscosity of R–S (Gardner-Holdt).

EXAMPLE 11

A mixture consisting of 14.25 grams of tung oil fatty acid and 42.75 grams of dehydrated castor oil fatty acid was interpolymerized with a mixture consisting of 48 grams of alpha-methyl styrene and 192 grams of styrene, which latter mixture contained 3 grams of benzoyl peroxide as polymerization catalyst, by procedure similar to that described in Example 9. The product was a clear amber colored resin having a melting point of 130° F. A solution consisting of 60 per cent by weight of the resin in toluene had a viscosity of T–U (Gardner-Holdt).

Other modes of applying the principle of the invention may be employed instead of those explained, change being made as regards the method or products herein disclosed, provided the steps or substances stated by any of the following claims or the equivalent of such stated steps or substances be employed.

We claim:

1. A process for making a toluene-soluble interpolymer of a monovinyl aromatic compound, an alpha-methylene alkyl aromatic compound and a drying oil fatty acid, which comprises interpolymerizing from 10 to 90 parts by weight of a drying oil fatty acid and from 90 to 10 parts of a mixture consisting of from 50 to 85 per cent by weight of a monovinyl aromatic compound having the formula:

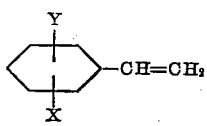

and from 50 to 15 per cent of an alpha-methylene alkyl aromatic compound having the formula:

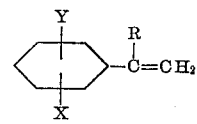

in which formulas X and Y each represents a member of the group consisting of hydrogen and lower alkyl radicals containing not more than three carbon atoms and R is an alkyl radical containing not more than two carbon atoms, by heating the mixture of polymerizable materials at temperatures between 120° and 300° C.

2. A process for making a toluene-soluble interpolymer of a monovinyl aromatic compound, an alpha-methylene alkyl aromatic compound and a drying oil fatty acid as described in claim 1, wherein the mixture of polymerizable materials is heated at temperatures between 120° and 300° C., in the absence of an added inert solvent.

3. A process for making a toluene-soluble interpolymer of styrene, alpha-methyl styrene and a drying oil fatty acid, which comprises interpolymerizing a mixture consisting of from 10 to 90 parts by weight of a drying oil fatty acid and from 90 to 10 parts of a mixture consisting of from 50 to 85 per cent by weight of styrene and from 50 to 15 per cent of alpha-methyl styrene, by heating the mixture at temperatures between 120° and 300° C.

4. A toluene-soluble interpolymer composed of from 10 to 90 parts by weight of a drying oil fatty acid and from 90 to 10 parts of a mixture consisting of from 50 to 85 per cent by weight of a monovinyl aromatic compound having the formula:

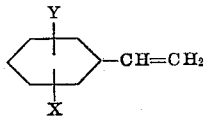

and from 50 to 15 per cent of an alpha-methylene alkyl aromatic compound having the formula:

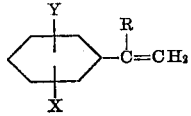

in which formulas X and Y each represents a member of the group consisting of hydrogen and lower alkyl radicals containing not more than three carbon atoms and R is an alkyl radical containing not more than two carbon atoms.

5. A toluene-soluble interpolymer as claimed in claim 4 wherein the drying oil fatty acid is tung oil fatty acid.

6. A toluene-soluble interpolymer as claimed in claim 4 wherein the drying oil fatty acid is linseed oil fatty acid.

7. A toluene-soluble interpolymer as claimed in claim 4 wherein the drying oil fatty acid is a mixture consisting of tung oil fatty acid and soybean oil fatty acid.

8. A toluene-soluble interpolymer composed of a drying oil fatty acid, styrene and alpha-methyl styrene in substantially the proportions: drying oil fatty acid from 10 to 90 parts by weight, and a mixture consisting of styrene and alpha-methyl styrene 90 to 10 parts by weight, in which mixture the alpha-methyl styrene is from 15 to 50 per cent by weight of the combined weight of the alpha-methyl styrene and the styrene.

GERALD A. GRIESS.
ARTHUR S. TEOT.

References Cited in the file of this patent

UNITED STATES PATENTS

| Number | Name | Date |
|---|---|---|
| 2,190,915 | Bass et al. | Feb. 20, 1940 |
| 2,320,724 | Gerhart et al. | June 1, 1943 |
| 2,457,768 | Arvin et al. | Dec. 28, 1948 |
| 2,468,748 | Griess et al. | May 3, 1949 |
| 2,468,770 | Morris et al. | May 3, 1949 |
| 2,470,757 | Bobaleck | May 24, 1949 |
| 2,560,592 | Opp et al. | July 17, 1951 |